(12) United States Patent
Crichlow

(10) Patent No.: US 7,167,102 B2
(45) Date of Patent: Jan. 23, 2007

(54) SYSTEM WITH REPLACEMENT METER COVER

(76) Inventor: Henry B. Crichlow, 716 Jona Kay Ter., Norman, OK (US) 73069

( * ) Notice: Subject to any disclaimer, the term of this patent is extended or adjusted under 35 U.S.C. 154(b) by 240 days.

(21) Appl. No.: 10/709,770

(22) Filed: May 27, 2004

(65) Prior Publication Data

US 2004/0246143 A1    Dec. 9, 2004

Related U.S. Application Data

(60) Provisional application No. 60/475,240, filed on Jun. 3, 2003.

(51) Int. Cl.
G08C 17/00    (2006.01)
(52) U.S. Cl. .................. 340/870.02; 324/156
(58) Field of Classification Search .......... 340/870.02, 340/870.28; 705/412; 702/61; 324/156, 324/115, 157; 379/106.07, 106.06
See application file for complete search history.

(56) References Cited

U.S. PATENT DOCUMENTS

| 4,491,789 | A |   | 1/1985 | Benbow ............... 324/113 |
|---|---|---|---|---|
| 4,811,011 | A | * | 3/1989 | Sollinger ............ 340/870.02 |
| 5,014,213 | A |   | 5/1991 | Edwards et al. ......... 364/483 |
| 5,049,810 | A |   | 9/1991 | Kirby et al. ............ 324/156 |
| 6,622,097 | B1 | * | 9/2003 | Hunter .................. 702/61 |
| 6,980,937 | B1 | * | 12/2005 | Hayes ..................... 703/2 |

* cited by examiner

Primary Examiner—Wendy R. Garber
Assistant Examiner—Hung Q Dang
(74) Attorney, Agent, or Firm—Richard D. Fuerle

(57) ABSTRACT

A system can be used with an existing meter that has a removable cover and a base and measures the usage of a utility commodity, such as electricity. The system replaces the removable cover with a replacement cover that fits onto the base in the same manner as the removable cover. The system has a usage reader inside the replacement cover that obtains information on the amount of the utility commodity that is used. No electrical or mechanical connection between the usage reader and the meter is made to obtain that information. An automatic meter reader, which includes a microprocessor for storing information and calculating charges and a transmitter for transmitting information to a remote receiver and a way to transfer information from the usage reader to the automatic meter reader is also part of the system.

20 Claims, 5 Drawing Sheets

SYSTEM WITH REPLACEMENT METER COVER

CROSS REFERENCE TO RELATED APPLICATIONS

This application claims priority from provisional application No. 60/475,240, filed Jun. 3, 2003, by Dr. Henry B. Crichlow, titled "Electric Meter Cover to Rapidly and Safely Connect Devices to Provide Automatic Meter Reading Services." This application is also related to pending U.S. Patent Application Publication No. US2002/0018545A1 for "Method and Apparatus for Reading a Meter and Providing Customer Service Via the Internet," U.S. patent application Ser. No. 10/016,049 for "Method and System for Establishing Internet Websites for Utility Meters Allowing Utility Meters to be Read Over the Internet," and U.S. patent application Ser. No. 10/033,667 for "Method and System for Energy Management Using Intelligent Agents Over the Internet."

BACKGROUND OF INVENTION

This invention relates to a cover that replaces the existing cover on a utility commodity meter. In particular, it relates to a system that includes a replacement cover that contains a reader for obtaining electric power usage information from the meter, a transmitter for sending that information to a remote receiver, and means for transferring that information from the reader to the transmitter. There are an estimated 265,000,000 utility electric meters in this country. These meters display, usually in kilowatts, the total amount of electric power that has been used on the line to which the meter is connected. Typically, the meter is read each month, usually by a person who goes to the location of the meter and copies down the current total amount of power used. The power company then uses that information to prepare a monthly bill.

Numerous meter cover inventions have been proposed to facilitate the automatic reading of electric meters.

U.S. Pat. No. 4,301,508 shows a rather complex calculating system using microprocessors to display KwHr data under the glass. The display shows up to 12 parameters in coded format derived from logic circuits and optical pulse devices.

Cover mounted Time-of-Day registers (TOD) are shown in U.S. Pat. No. 4,491,789. The registers communicate by way of light radiations to an external programmer reader device.

U.S. Pat. No. 5,010,335 shows a cover which allows multiplexing in a single optical port which allows several parameters to be read through a single port. The meter cover is complicated with two or more electronic circuits.

A cover refinement for poly-phase meters is provided by U.S. Pat. No. 5,014,213 which has Time-of-Day registers mounted inside the cover and can transmit this data optically to external reader devices.

U.S. Pat. No. 5,049,810 shows a meter cover with an optical coupler with a conduit, lens, and a means for engaging external reader and coupler. U.S. Pat. No. 5,296,803 is exactly similar to U.S. Pat. No. 5,049,810.

A meter cover with reduced torque needed to close is shown by U.S. Pat. No. 5,473,504.

A viewing window with light pipes for viewing is the basis of U.S. Pat. No. 5,861,742, which is manufactured from polycarbonate and acrylic material.

A thermoplastic injection molded cover is shown in U.S. Pat. No. 6,316,932. This embodiment is tamper resistant and weather proof. The cover has a terminal box on the bottom of the cover.

SUMMARY OF INVENTION

After careful consideration of the above noted problems and prior art solutions, the inventor herein describes a novel and improved system that includes a utility meter cover that can be fitted to new or retrofitted to existing utility meters safely, easily, and rapidly.

This application follows previous earlier patents filed by the inventor on various processes to provide services to read electric utility meters via the internet. This technology involves the ability to rapidly and economically connect the utility meter to automatic meter reading (AMR) electronic and other devices by replacing the existing meter cover, without removing the meter base, leaving the meter base intact and in-place.

This invention describes a unique new type of system that enables existing utility electric meters to be connected to a variety of external devices in a rapid, safe, economic, and efficient manner. Because of the large number of meters in existence today, it is economically infeasible to replace these meters with new and more modern devices and still provide the low cost power that customers require and expect. This invention teaches a system which, in concert with other improvements, can provide the needed mechanism to allow the retrofit system to be used within the constraints of economics and timeliness.

With this invention, which involves in part, the replacement of the existing glass meter cover by a specially designed cover, the energy meter can be connected to any device be it, electric, electronic, mechanical or any combination thereof without disturbing the meter operation and the ongoing flow of electricity to the premises. In addition, special pulse reading devices can be integrated into this meter cover to provide fundamental energy data and other readings for the automatic meter reading services.

Meter reading is an integral part of the electric power industry to provide a secure supply of electricity. There is a entire allied industry specializing in meter reading and meter reading tools. By implementing this new invention, each new meter can be refitted or existing meters retrofitted with modern appliances or devices to enable and implement this new system, some of which are taught in other patents pending by this inventor.

Minimally trained personnel with limited knowledge of the industry and electronics can use this process. Simply spinning the cover counterclockwise in most cases easily removes the existing cover and spinning clockwise replaces the meter cover. In a few instances it is necessary to remove a circular collar or clamp, this is usually a simple task. Retrofitting the new cover is also a simple spin-on operation in which no disturbance of the meter operation occurs. When the complete meter is removed from the base there is high voltage current flowing through this base and this condition creates a safety hazard to utility workers. This hazard is avoided in this invention because it is not necessary to remove the meter from its base in order to install the new system. The original meter cover is simply removed and is replaced by the replacement cover described herein.

This invention provides a system and method whereby all meters can be upgraded in the field or at a meter shop, without the need for expensive and time consuming retrofit operations that are commonly undertaken.

This invention allows the orderly development of economical automatic metering systems, which require access to meters to obtain the pulse and energy use information to be transferred to some appropriate device for use in metering.

An object of this invention is to provide an improved energy usage meter by replacing the previously designed meter covers with this more effective, efficient and economical device.

A more specific objective is to provide an improved means of accommodating the new electronic devices, which are being developed for automatic meter reading with a minimal amount of retooling the meters.

Another specific objective of this invention is to provide a rapid means of retrofitting existing meters or of installing new meters with a more versatile meter cover.

A further objective is to increase the safety of the retrofitting operation such that the installer is not exposed to the hazards of high voltage electric currents while installing the AMR devices or replacing meter covers.

Another specific objective is to provide a novel system where the AMR device can be an integral part of the meter cover, which allows the AMR device to be pre-assembled thereon and then fitted to the meter by a simple screw-on procedure, without affecting meter operation.

Another specific objective is to provide a novel system where the AMR device can be an integral part of the meter cover, which allows the AMR device to be pre-assembled thereon and then fitted to the meter by a simple screw-on procedure, with out affecting meter operation.

Another specific objective is to provide a novel system which can allow the AMR device which is an integral part of the cover to be wirelessly connected to other external AMR devices as described in companion applications, US2002/0018545, Ser. Nos. 10/016,049, 10/033,667, cited hereinabove.

Another specific objective is to provide a method wherein the AMR device can be adjusted to allow a precise position of the device before final attachment to the existing or new meter.

Another specific objective is to implement an improved means of increasing the meter's capability without decreasing its reliability and meter accuracy.

Another objective is to utilize a standard meter existing rotating wheel and other internals without having to modify the existing parts of the meter.

Another specific objective is to provide the same degree of transparency of the meter cover by using, glass, Acrylic, Lexan®, or similar transparent material that is of high durability and demonstrated longevity under outdoor UV conditions.

Another specific objective is to minimize the cost of retrofitting existing meters or fitting new meters by using readily available and basic commodity raw material manufacturing products, Acrylic, and Lexan® to fashion the covers through thermoplastic molding or similar high capacity low cost manufacturing processes.

Another specific objective is to allow the use of recyclable post-consumer material like waste clear plastics with suitable UV resistant additives, to manufacture these meter covers. This use provides for economies of cost and also for eco-environmental benefits.

Other objects and advantages of this invention will hereinafter appear.

BRIEF DESCRIPTION OF DRAWINGS

The present invention can be more readily understood by reference to the accompanying drawing in which.

DETAILED DESCRIPTION

Figure 1:
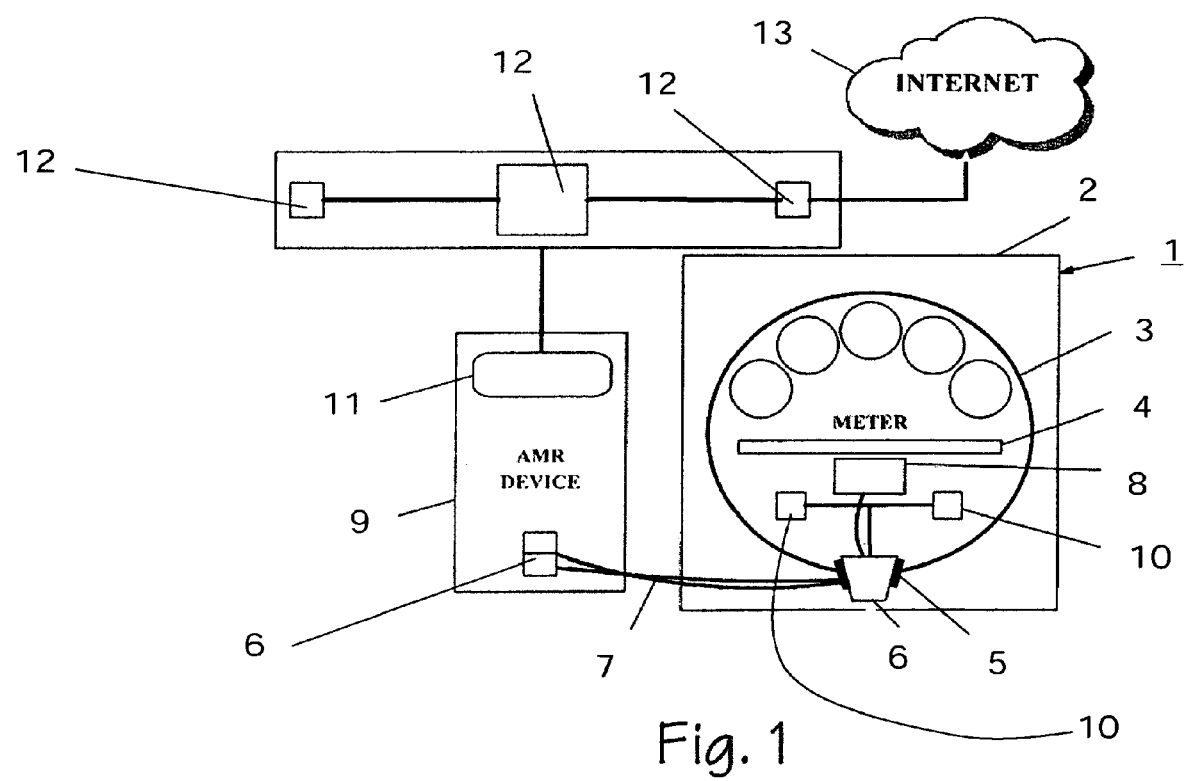
FIG. 1 is a diagrammatic front view of a certain presently preferred embodiment of a system according to this invention, where a connection is made between an automatic meter reading device and the internet via a communications device. This system is the basis of companion filings, Ser. Nos. 10/016,049, 10/033,667, 516,218, and 521,402 by this inventor to perform energy management services via the internet.
Figure 2:
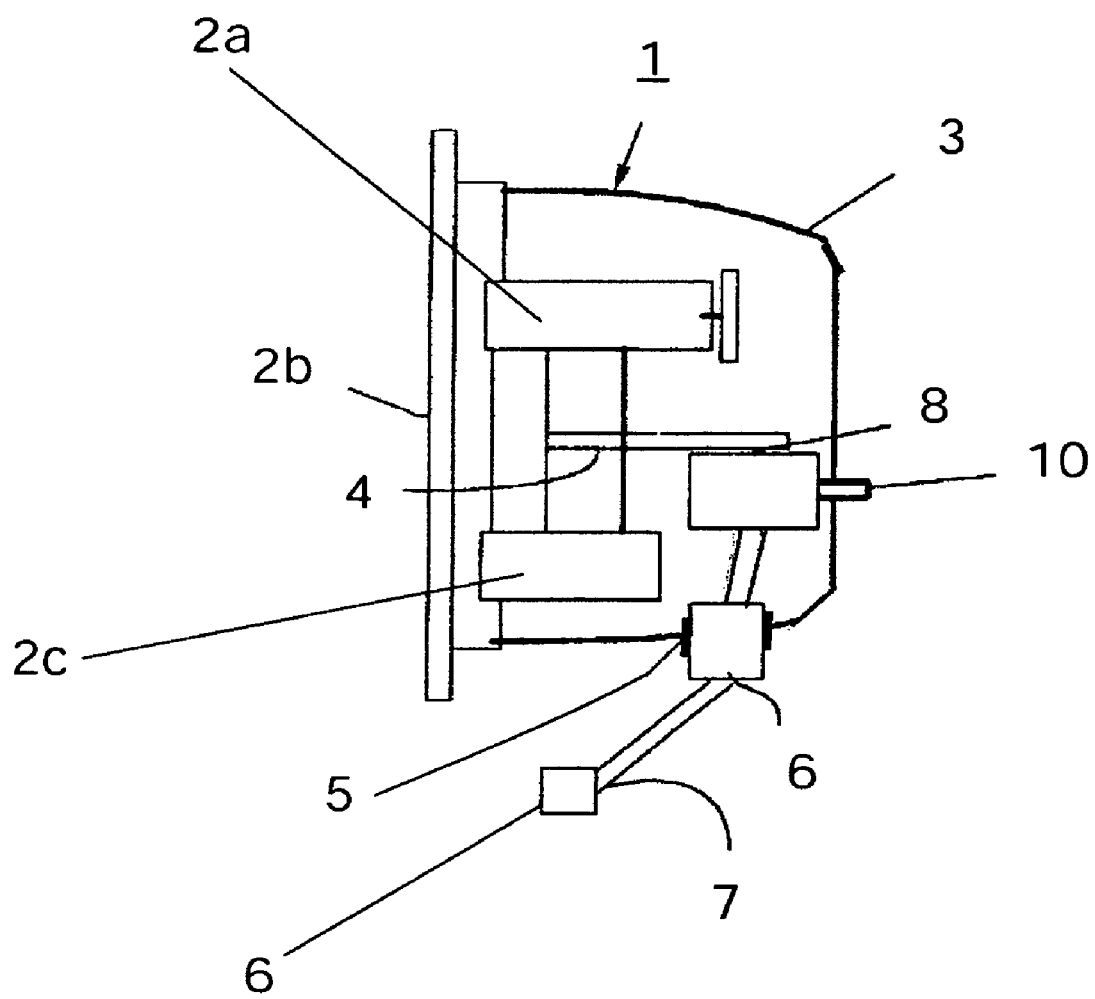
FIG. 2 is a side view of the meter shown in FIG. 1.

Referring to FIGS. 1 and 2, meter 1 has a support base 2 of elements 2a, 2b, and 2c, usually of metal, and a cover 3. Meter 1 measures the amount of a utility commodity that is used at a facility, such as a home, office, or other location. Utility commodities that may be measured include electric power, gas, and water. Meter wheel 4 rotates at an angular velocity that is proportional to the amount of the utility commodity that is being used.

Cover 3 is a replacement cover that is similar in design to the original cover (not shown) that was on the meter, so that the original cover can be removed and cover 3 can be installed in the same manner as the original cover was installed. This may be done by screwing it on or by means of clamps, bolts, or metal screws. In one method of attachment, cover 3 is constructed to allow a twist on and twist off operation. Anyone skilled in the art can readily understand the various ways by which covers may be attached to bases.

Cover 3 may be made of glass or clear plastic, such as polycarbonate or polyacrylate, with ultraviolet protection added as needed. Cover 3 may also be manufactured from economic recyclable waste clear plastics, which are abundantly available. It is preferably integrally molded, but it may also be made by other methods.

Cover 3 may be provided with an aperture 5 in which is fitted connector 6, which facilitates connecting wires 7 between usage reader 8 and AMR 9. AMR 9 contains, inter alia, a microprocessor (a small computer, not shown) for storing information and performing calculations and a transmitter (not shown) that sends information to the utility company. AMR 9 may be inside a weatherproof container (not shown), mounted near the meter on the outside of the building on which the meter is mounted. The AMR may also be located near a connection to a telephone line, through which it may connect to the internet. The space between connector 6 and cover 3 may be sealed to prevent the passage of water, dirt, and insects, and to conform to local codes. Aperture 5 may be positioned on cover 3 in a variety of locations to allow for ease of connection to external electronic or other energy management devices.

Usage reader 8 is directly attached to cover 3. Reader 8 is preferably an optical pulse reader that determines the rate at which meter wheel 4 rotates. It may then convert this rotational information to KYZ (a type of electrical signal) or other pulse data. Reader 8 senses the rotation by using photo-sensing technology, which is well known in the industry (e.g., American innovations of Austin, Tex. and NERTEC Design, Inc. of Quebec, Canada sell pulse sensors) and not a part of this invention. (Pulse reading may be performed, for example, by means of an infra red sensor that detects a black line on the meter wheel.)

Reader 8 is provided with adjustable screw connectors 10, which are used to integrally attach a reader 8 to cover 3. Connectors 10 may be used to align and adjust the position of reader 8 to allow accurate meter reading of rotating meter wheel 4. A communications device 11, typically a computer modem, connects AMR 9 to telephone jack 12, which forms part of a public switched telephone network (PSTN). Jacks 12, which are housed in enclosure 18, may be connected to internet 13.

Figure 3:
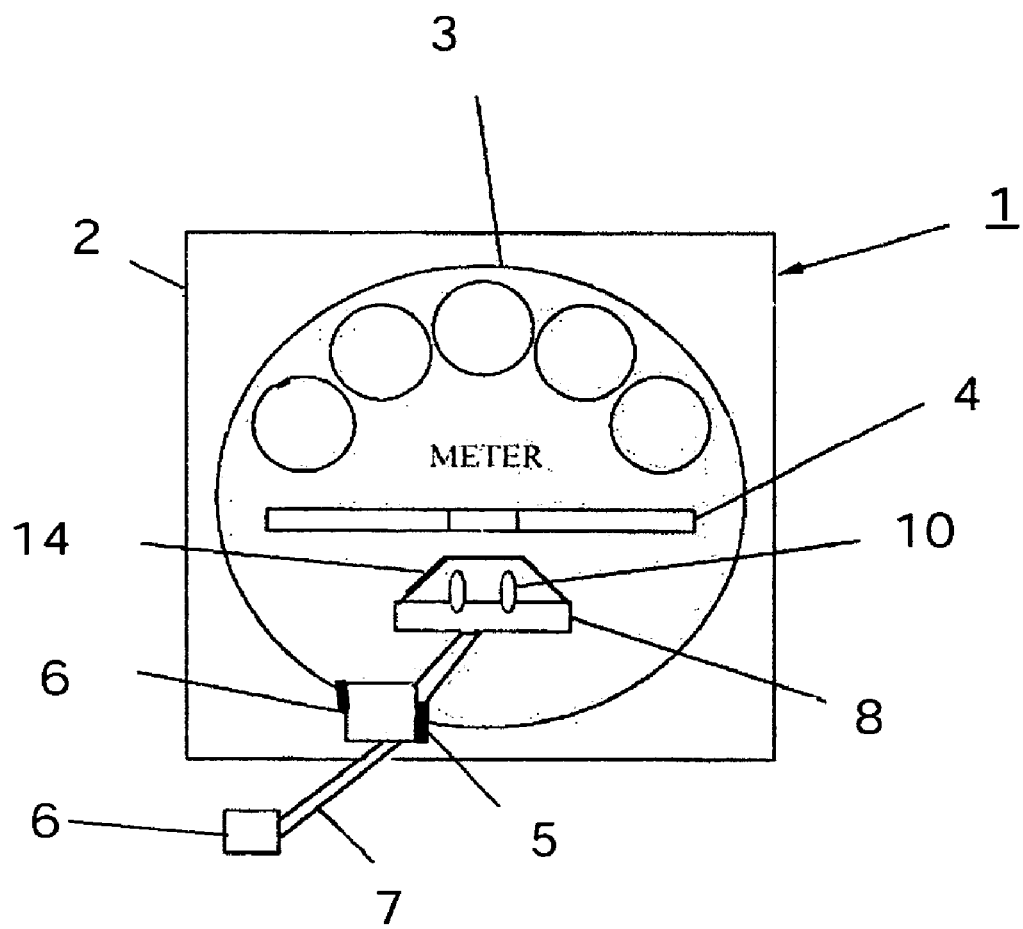
FIG. 3 is a front view of another embodiment of the meter shown in FIG. 1, where the exit hole can be drilled or cut at various locations in the meter cover. It also shows the beveled sides of the pulse-reading device, which allows for rotation of the meter cover without interfering with the meter elements.

In FIG. 3, reader 8 is shaped with beveled sides 14 instead of rectangular or square sides to allow angular rotation of the cover 3 during installation without interfering with meter wheel 4.

Figure 4:
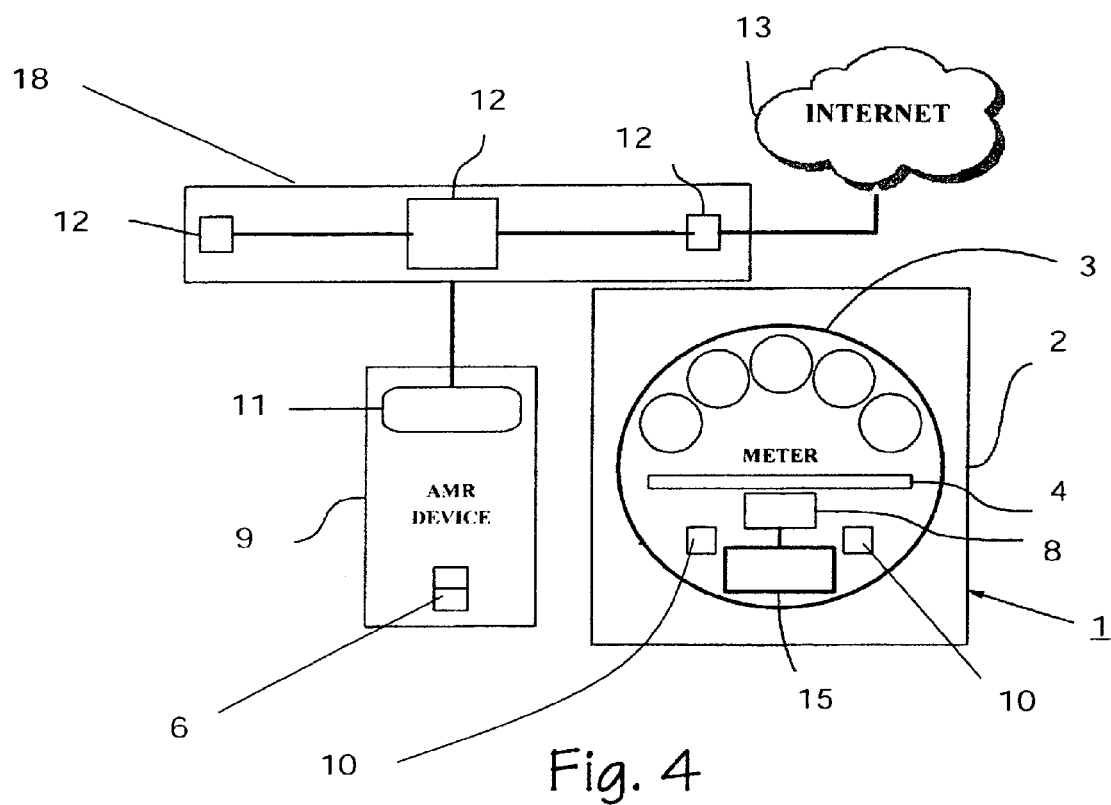
FIG. 4 is a diagrammatic front view of another embodiment of the system shown in FIG. 1, where the cover has a wireless AMR sensor or device which is connected to an adjacent or remote automatic meter reading device wirelessly.

FIG. 4 illustrates a wireless embodiment of this invention. In FIG. 4, wireless sending unit 15 is attached to the inside of cover 3 and can send the information and data from the meter to adjacent or remote AMR 9, which forms part of the technology described in the hereinabove-cited companion applications by the inventor, herein incorporated by reference. In the wireless embodiment, no wires 7 are needed and AMR 9 communicates wirelessly with reader 8.

Figure 5:
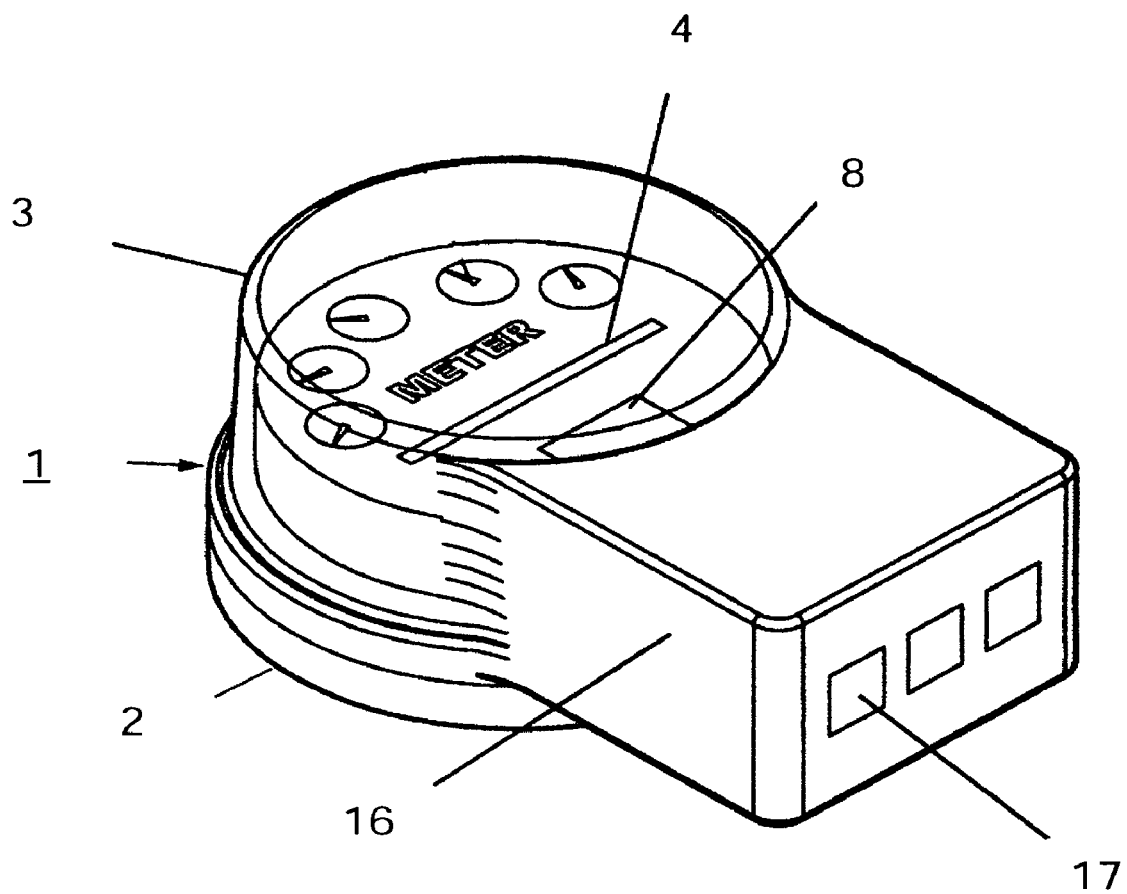
FIG. 5 is an isometric view of another embodiment of a replacement cover according to this invention, where the cover has an integral lower extension that contains the AMR.

In FIG. 5, cover 3 has a lateral extension 16, to house the AMR (not shown). Communication and power attachment may be made through plugs 17. Alternatively, the communication and power leads may exit extension 16 through openings (not shown) which are located in the base or the back of the unit.

The signal and data may be transmitted from AMR 9 to the internet by pager, radio frequency transmission, satellite uplink, regular phone line, powerline carrier (the electric line itself is used as the signal carrier), via the internet, or by other means. Power to operate the system may be obtained from the electric line, a telephone line, batteries, solar panel, or other source.

Since the invention has been designed to be a simple, reliable device, the operation is simple and uncomplicated. The user removes the existing meter cover from an existing electric meter by either rotating the cover counter clockwise or by unscrewing the fasteners that hold the meter cover in place. There is no need to shut off the power to the system since this invention provides for installer safety by not exposing any line voltages to the installer. The internal mechanism of the existing meter 1 is exposed when the existing cover is removed, however the internal meter mechanism still sits above and covers the meter base 2 and thus no high voltage power is exposed to the installer. Replacement cover 3 or 15 is installed by rotating the cover clockwise or by using the appropriate fasteners to secure the cover onto the meter 1. Connector 6 and wires 7 (if not wireless) are secured and affixed to the external device that is attached to the meter.

After reading the above detailed embodiment of the subject invention, it will occur to those skilled in the art that modifications and alternatives can be practiced within the spirit of the invention. and accordingly the spirit and scope of the subject invention should not be limited to the specific details in the embodiments above.

The invention claimed is:

1. In a meter that measures the usage of a utility commodity and has a base and a removable cover, a system that replaces said removable cover comprising
    (A) a replacement cover that fits onto said base in the same manner as said removable cover, said replacement cover having an extension;
    (B) a usage reader inside said replacement cover directly attached to said cover that obtains information on the amount of said utility that is used without making an electrical or mechanical connection to said meter;
    (C) an automatic meter reader inside and attached to said extension, which comprises a microprocessor for storing information and calculating charges and a transmitter for transmitting information to a remote receiver;
    (D) means for transferring information from said usage reader to said automatic meter reader; and
    (E) a transmitter for transferring information from said automatic meter reader to a remote receiver.

2. A system according to claim 1 mounted on the base of an existing operating meter.

3. A system according to claim 1 mounted on the base of a new meter.

4. A system according to claim 1 wherein said replacement cover is attachable to said base without shutting off power to said meter.

5. A system according to claim 1 wherein said base is cylindrical and said replacement cover is attachable by rotating it relative to said base.

6. A system according to claim 1 wherein said replacement cover is made of glass or clear plastic.

7. A system according to claim 1 wherein said transmitter transmits information from said automatic meter reader through a telephone line to said remote receiver.

8. A system according to claim 1 wherein said utility is electric power.

9. A system according to claim 1 wherein said extension extends laterally from said cover and houses said usage reader and said automatic meter reader.

10. A system according to claim 9 wherein said extension has a first plug for receiving power and a second plug for transmitting and receiving information.

11. A system according to claim 1 wherein said meter has a meter wheel, the angular velocity of which is proportional to the usage of said utility commodity.

12. A system according to claim 11 wherein said usage reader is an optical pulse reader.

13. A system according to claim 12 wherein the position of said optical pulse reader relative to said meter wheel is adjustable.

14. A system according to claim 1 wherein said said transmitter transfers information wirelessly.

15. A system according to claim 1 wherein said transmitter transfers information to the internet.

16. A method of obtaining information from a meter that measures usage of a commodity utility use comprising
    (A) removing said removable cover from said meter; and
    (B) installing a system according to claim 1 onto said base of said meter.

17. In an electric power meter that measures the usage of electric power and has a base and a removable cover, a system that replaces said removable cover comprising (A) a transparent replacement cover that fits onto said base in the same manner as said removable cover, said replacement cover having a lateral extension;
(B) an optical pulse reader inside said replacement cover directly attached to said cover that obtains information on the amount of said electric power that is used without an electrical or mechanical connection to said meter;
(C) an automatic meter reader inside and attached to said lateral cover, said automatic meter reader comprising a microprocessor for storing information and calculating charges and a transmitter for transmitting information to a remote receiver; and
(D) means for transferring information from said optical pulse reader to said automatic meter reader.

18. A method of obtaining information from a meter that measures electrical power usage comprising
(A) removing said removable cover from said meter; and
(B) installing a system according to claim 17 onto said base of said meter.

19. In an electric power meter that measures the usage of electric power and has a base and a removable cover, a system that replaces said removable cover comprising
(A) a transparent replacement cover that fits onto said base in the same manner as said removable cover, said replacement cover having a lateral extension that has a power-receiving plug and a communication plug;
(B) an optical pulse reader inside said replacement cover directly attached to said replacement cover that obtains information on the amount of said electric power that is used without an electrical or mechanical connection to said meter;
(C) an automatic meter reader inside and attached to said lateral cover, said automatic meter reader comprising a microprocessor for storing information and calculating charges;
(D) means for transferring information from said optical pulse reader to said automatic meter reader, whereby said system receives power through said power plug and sends and receives information through said communication plug.

20. A method of obtaining information from a meter that measures electrical power usage comprising
(A) removing said removable cover from said meter;
(B) installing a system according to claim 19 onto said base of said meter; and
(C) attaching a power line to said power plug and a communication line to said communication plug.

\* \* \* \* \*